United States Patent
Nakagawa et al.

(10) Patent No.: US 9,409,245 B2
(45) Date of Patent: Aug. 9, 2016

(54) WIRE ELECTRIC-DISCHARGE MACHINING APPARATUS, WIRE ELECTRIC-DISCHARGE MACHINING METHOD, AND CONTROL DEVICE

(71) Applicant: Mitsubishi Electric Corporation, Tokyo (JP)

(72) Inventors: Takayuki Nakagawa, Tokyo (JP); Yuto Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 150 days.

(21) Appl. No.: 14/391,195

(22) PCT Filed: Dec. 10, 2013

(86) PCT No.: PCT/JP2013/083065
§ 371 (c)(1),
(2) Date: Oct. 8, 2014

(87) PCT Pub. No.: WO2015/087389
PCT Pub. Date: Jun. 18, 2015

(65) Prior Publication Data
US 2015/0266122 A1    Sep. 24, 2015

(51) Int. Cl.
*B23H 1/02* (2006.01)
*B23H 7/06* (2006.01)
*G05B 19/18* (2006.01)

(52) U.S. Cl.
CPC .. *B23H 1/02* (2013.01); *B23H 7/06* (2013.01); *B23H 7/065* (2013.01); *G05B 19/18* (2013.01)

(58) Field of Classification Search
CPC combination set(s) only.
See application file for complete search history.

(56) References Cited

U.S. PATENT DOCUMENTS

| 4,546,227 A | 10/1985 | Gamo et al. |
| 5,021,622 A | 6/1991 | Magara et al. |
| 5,573,681 A | 11/1996 | Ishibashi et al. |

(Continued)

FOREIGN PATENT DOCUMENTS

| DE | 37 90 661 C2 | 10/1996 |
| DE | 11 2008 003 926 T5 | 6/2011 |

(Continued)

OTHER PUBLICATIONS

International Search Report for PCT/JP2013/083065 dated Feb. 25, 2014.

(Continued)

*Primary Examiner* — Carlos Ortiz Rodriguez
(74) *Attorney, Agent, or Firm* — Sughrue Mion, PLLC (57) ABSTRACT

A control device of the wire electric-discharge machining apparatus includes a speed-ratio computing unit that calculates machining speed information related to a corner machining speed in a corner machining portion corresponding to an amount of machining in the corner machining portion, on the basis of NC data, a feedback machining-speed computing unit that calculates, as a feedback machining speed to be used for feedback control of wire electric-discharge machining, a machining speed corresponding to an inter-electrode state between a wire electrode and a workpiece measured during wire electric-discharge machining, and a multiplier that calculates a machining speed to be used for control of a machining device at a time of machining the corner machining portion, on the basis of the machining speed information and the feedback machining speed.

9 Claims, 7 Drawing Sheets

(56) References Cited

U.S. PATENT DOCUMENTS

| | | |
|---|---|---|
| 6,278,075 B1 | 8/2001 | Kamiguchi et al. |
| 6,774,334 B1 | 8/2004 | Kobayashi |
| 7,039,490 B2 | 5/2006 | Kurihara et al. |
| 7,262,381 B2 | 8/2007 | Hiraga et al. |
| 2011/0100959 A1 | 5/2011 | Onodera et al. |

FOREIGN PATENT DOCUMENTS

| | | |
|---|---|---|
| JP | 1-501051 A | 4/1989 |
| JP | 01-127226 A | 5/1989 |
| JP | 02-005531 B2 | 2/1990 |
| JP | 06-126536 A | 5/1994 |
| JP | 07-032222 A | 2/1995 |
| JP | 10-076429 A | 3/1998 |
| JP | 11-347846 A | 12/1999 |
| JP | 2000-126939 A | 5/2000 |
| JP | 2004-148472 A | 5/2004 |
| JP | 2004-283968 A | 10/2004 |
| JP | 2006-123065 A | 5/2006 |
| JP | 5077433 B2 | 9/2012 |
| WO | 02/36295 A1 | 5/2002 |
| WO | 2010001472 A1 | 1/2010 |

OTHER PUBLICATIONS

Written Opinion for PCT/JP2013/083065 dated Feb. 25, 2014.
Communication dated Aug. 11, 2015, issued by the German Patent and Trademark Office in corresponding German Application No. 11 2013 001 669.9.

WIRE ELECTRIC-DISCHARGE MACHINING APPARATUS, WIRE ELECTRIC-DISCHARGE MACHINING METHOD, AND CONTROL DEVICE

CROSS REFERENCE TO RELATED APPLICATIONS

This application is a National Stage of International Application No. PCT/JP2013/083065 filed Dec. 10, 2013, the contents of all of which are incorporated herein by reference in their entirety.

FIELD

The present invention relates to a wire electric-discharge machining apparatus that machines a workpiece while changing a machining speed, a wire electric-discharge machining method, and a control device.

BACKGROUND

A wire electric-discharge machining apparatus has a machining-speed control system that increases or decreases the machining speed so that a detection value of an inter-electrode state (for example, an inter-electrode voltage and a discharge frequency) between a workpiece and a wire electrode becomes constant. Because there are many high-frequency disturbances (noise) between such electrodes, even in a case of linear machining, the detection value of the inter-electrode state may largely fluctuate.

As a measure against such fluctuation, there is a method of stabilizing the machining speed by an averaging procedure or a low-pass filtering (filtering for removing only high-frequency components) procedure. However, because the amount of machining rapidly changes in a corner machining portion, responsiveness of machining speed control cannot be ensured by the averaging procedure and the low-pass filtering procedure. Therefore, a wire electric-discharge machining apparatus described in Patent Literature 1 preliminarily predicts the change in the amount of machining to control the machining speed in the corner machining portion depending on the predicted value.

CITATION LIST

Patent Literature

Patent Literature 1: Japanese Patent Publication No. 5077433

SUMMARY

Technical Problem

However, according to the conventional technique described above, because the machining speed is controlled on the basis of only the preliminary predicted value, when the workpiece deforms due to residual stress in the workpiece, the machining speed cannot be corrected. Furthermore, according to the conventional technique, when there is a change in machining due to discharge of machining waste or temperature conditions, the machining speed cannot be corrected. Further, according to the conventional technique, when the machining speed is adjusted depending on the individual machining state, there are problems such as that only a skilled worker can handle the state and adjusting man-hours increase.

The present invention has been achieved in view of the above, and an object of the present invention is to provide a wire electric-discharge machining apparatus that can perform machining easily at the machining speed corresponding to the inter-electrode state, a wire electric-discharge machining method, and a control device.

Solution to Problem

In order to solve the above problems and achieve the object, the present invention relates to a wire electric-discharge machining apparatus including: a machining device that performs wire electric-discharge machining on a linear machining portion and a corner machining portion of a workpiece by using a wire electrode; and a control device that controls the machining device, wherein the control device includes a corner-speed computing unit that calculates machining speed information related to a corner machining speed in the corner machining portion corresponding to an amount of machining in the corner machining portion, on a basis of NC data being a machining program to be used at a time of performing wire electric-discharge machining on the workpiece, a feedback computing unit that calculates, as a feedback machining speed to be used for feedback control of the wire electric-discharge machining, a machining speed corresponding to an inter-electrode state between the wire electrode and the workpiece measured during the wire electric-discharge machining, and an output-speed computing unit that calculates a control machining speed to be used for control of the machining device at a time of machining the corner machining portion, on a basis of the machining speed information and the feedback machining speed.

Advantageous Effects of Invention

According to the present invention, an effect is obtained where it is possible to perform machining easily at the machining speed corresponding to the inter-electrode state.

DESCRIPTION OF EMBODIMENTS

A wire electric-discharge machining apparatus, a wire electric-discharge machining method, and a control device according to embodiments of the present invention will be explained below in detail with reference to the drawings. The present invention is not limited to the embodiments.

First Embodiment

Figure 1:
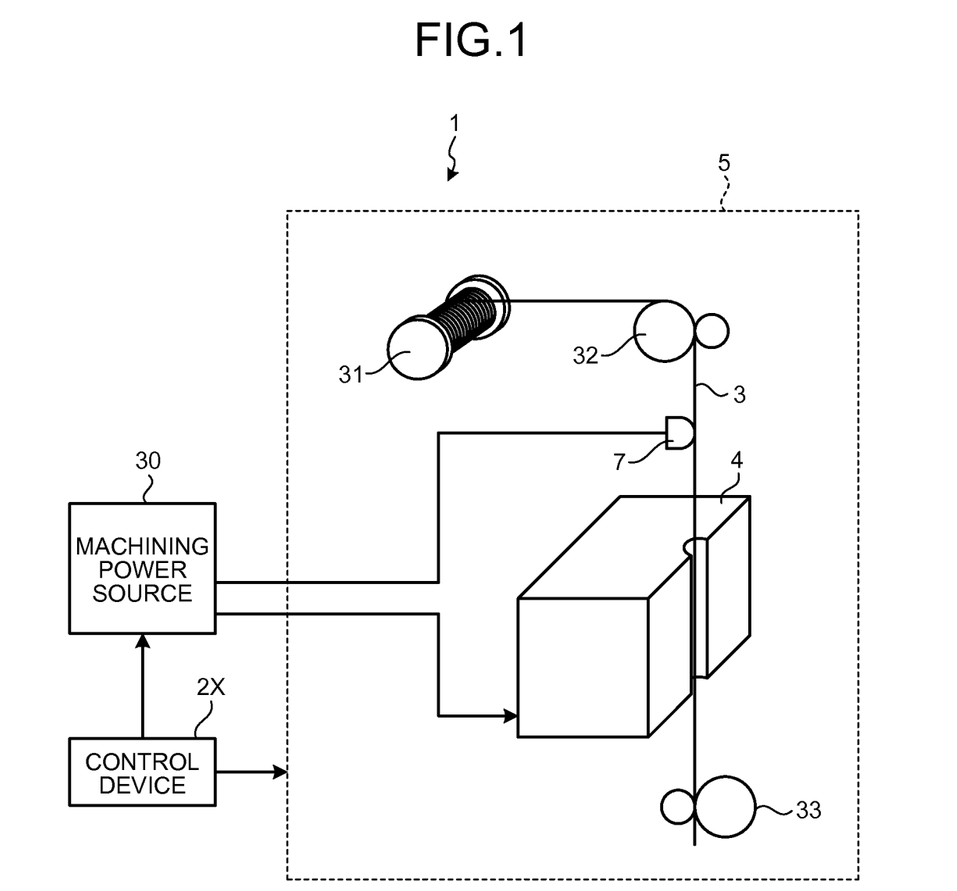
FIG. 1 is a diagram showing the configuration of a wire electric-discharge machining apparatus according to a first embodiment.

FIG. 1 is a diagram showing the configuration of a wire electric-discharge machining apparatus according to a first embodiment. A wire electric-discharge machining apparatus 1 according to the present embodiment changes the machining speed with respect to a workpiece on the basis of information regarding the change in the amount of machining (preliminary information) and the inter-electrode state (a discharge state). The wire electric-discharge machining apparatus 1 controls the machining speed such that the state quantity (an inter-electrode voltage V1 or the like described later) in the inter-electrode state between a workpiece 4 and a wire electrode 3 matches a command value (an inter-electrode voltage command C1 described later).

The wire electric-discharge machining apparatus 1 includes a machining device 5 that machines the workpiece 4. The machining device 5 includes the wire electrode 3, a wire bobbin 31, a feed roller 32, a take-up roller 33, and a power feed contact 7. The wire bobbin 31 feeds the wire electrode 3 to the feed roller 32.

The feed roller 32 controls the tension of the wire electrode 3 by feeding the wire electrode 3 fed from the wire bobbin 31 to the side of the workpiece 4. The feed roller 32 is arranged between the wire bobbin 31 and the workpiece 4 and applies tension mainly in an opposite direction to the traveling direction of the wire electrode 3.

The take-up roller 33 is arranged on the side where the wire electrode 3 is collected. The take-up roller 33 winds the wire electrode 3 fed from the wire bobbin 31 via the feed roller 32 substantially at a constant collecting speed. With this configuration, the wire electrode 3 is extended under tension between the feed roller 32 and the take-up roller 33. Machining of the workpiece 4 is performed by the wire electrode 3 that is extended under tension.

The wire electric-discharge machining apparatus 1 includes a control device 2X and a machining power source 30. The machining power source 30 is connected to the control device 2X, the workpiece 4, and the power feed contact 7. The machining power source 30 is a power supply device that feeds an electric current to the power feed contact 7 according to the instruction from the control device 2X, thereby applying a voltage between the wire electrode 3 and the workpiece 4.

The wire electric-discharge machining apparatus 1 controls a machining route by controlling the relative positions of the workpiece 4 and the wire electrode 3. Accordingly, the wire electric-discharge machining apparatus 1 can control the machining route by controlling the position of the wire electrode 3 or can control the machining route by controlling the position of the workpiece 4.

When controlling the position of the wire electrode 3, the control device 2X controls the position of the machining device 5 including the wire bobbin 31, the feed roller 32, the take-up roller 33, and the power feed contact 7. When controlling the position of the workpiece 4, the control device 2X controls the position of a surface plate (not shown) on which the workpiece 4 is placed. A case where the wire electric-discharge machining apparatus 1 controls the position of the wire electrode 3 (the machining device 5) to control the machining route is explained below.

Figure 2:
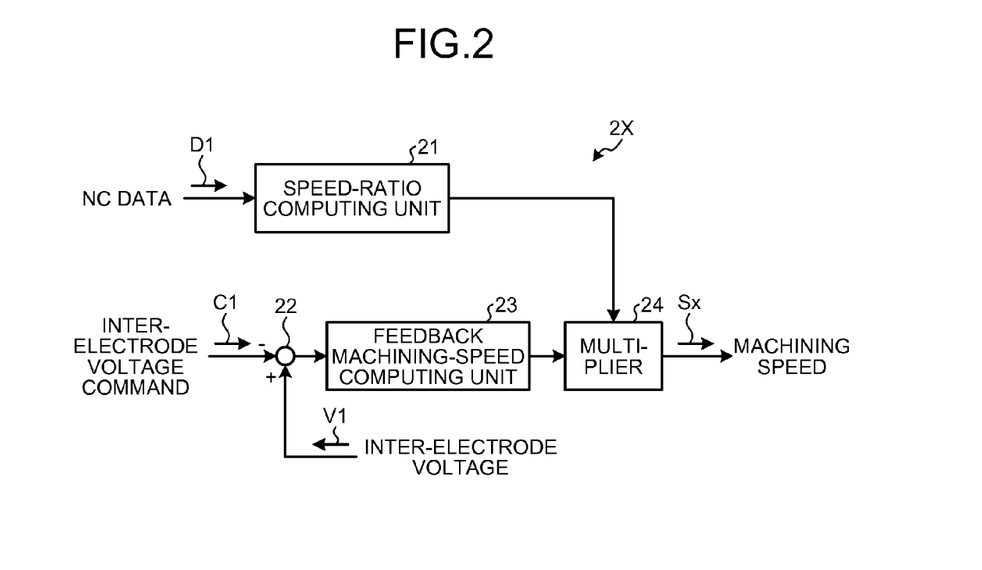
FIG. 2 is a block diagram showing the configuration of a control device according to the first embodiment.

FIG. 2 is a block diagram showing the configuration of the control device according to the first embodiment. The control device 2X includes a speed-ratio computing unit 21, a subtractor 22, a feedback machining-speed computing unit 23, and a multiplier 24.

The speed-ratio computing unit (corner-speed computing unit) 21 calculates the ratio of the machining speed to a reference value on the basis of preliminary information obtained beforehand. The preliminary information includes, for example, a machining shape (a radius and the like), an approach amount, and a discharge gap. The reference value (the reference machining speed) is, for example, the machining speed of a linear machining portion.

The speed-ratio computing unit 21 calculates machining speed information related to the machining speed at a corner machining portion of the workpiece 4. The speed-ratio computing unit 21 according to the present embodiment calculates the appropriate ratio (hereinafter, "speed ratio") of the machining speed (corner machining speed) in the corner machining portion to the machining speed (linear machining speed) in the linear machining portion.

Figure 3:
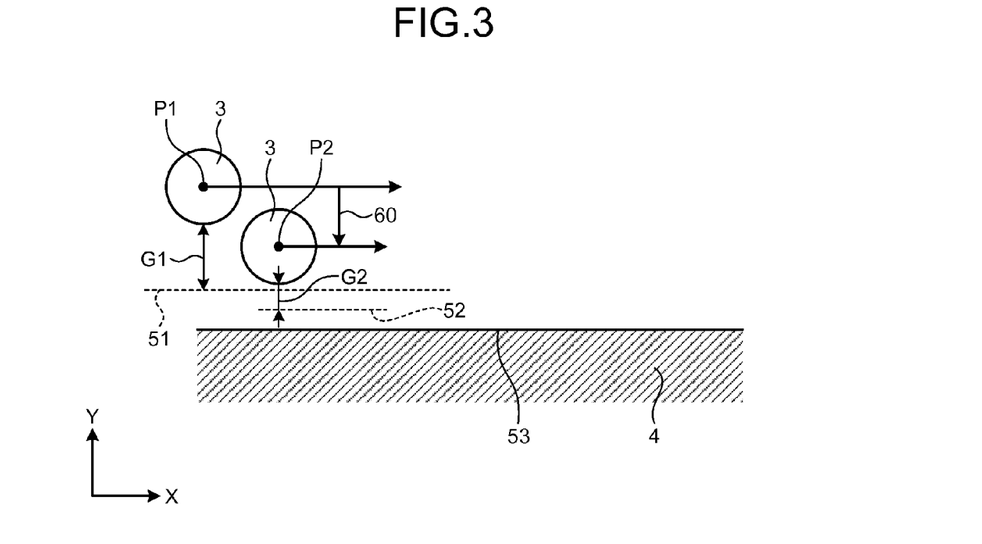
FIG. 3 is an explanatory diagram of an approach amount.

FIG. 3 is an explanatory diagram of the approach amount. A case where the workpiece 4 is machined while moving the wire electrode 3 in an X direction (the right direction in FIG. 3) is explained here. The wire electric-discharge machining apparatus 1 performs machining a plurality of times on the workpiece 4 by moving the wire electrode 3 a plurality of times with respect to the workpiece 4 (reciprocating machining or repeated machining in the same direction). The wire electric-discharge machining apparatus 1 performs, for example, rough machining on the workpiece 4, and first to Nth finish machining (N is a natural number) on the workpiece 4.

In FIG. 3, the position of the wire electrode 3 with respect to the workpiece 4 at the time of performing the first finish machining and the second finish machining is shown in a sectional view. At the time of performing the first finish machining, the wire electrode 3 is moved to a position P1 where the distance from a first machining surface 51 becomes a discharge gap G1. At the time of performing the second finish machining, the wire electrode 3 is moved to a position P2 where the distance from a second machining surface 52 becomes a discharge gap G2.

In this case, the difference in the distance in a Y direction between the wire electrode 3 and the workpiece 4 (the shortest distance from the wire electrode 3 to the workpiece 4) during the first finish machining and the second finish machining is an approach amount 60. In other words, the difference (a distance) between a Y coordinate at the position P1 and a Y coordinate at the position P2 of the wire electrode 3 is the approach amount 60.

The sizes of the discharge gaps G1 and G2 may be different in the first finish machining and the second finish machining, and thus the approach amount 60 may not always correspond to the discharge gaps G1 and G2. After the second finish machining is completed, finish machining of the workpiece 4 is performed up to Nth times, thereby machining the workpiece 4 up to a final machining surface 53.

Figure 4:
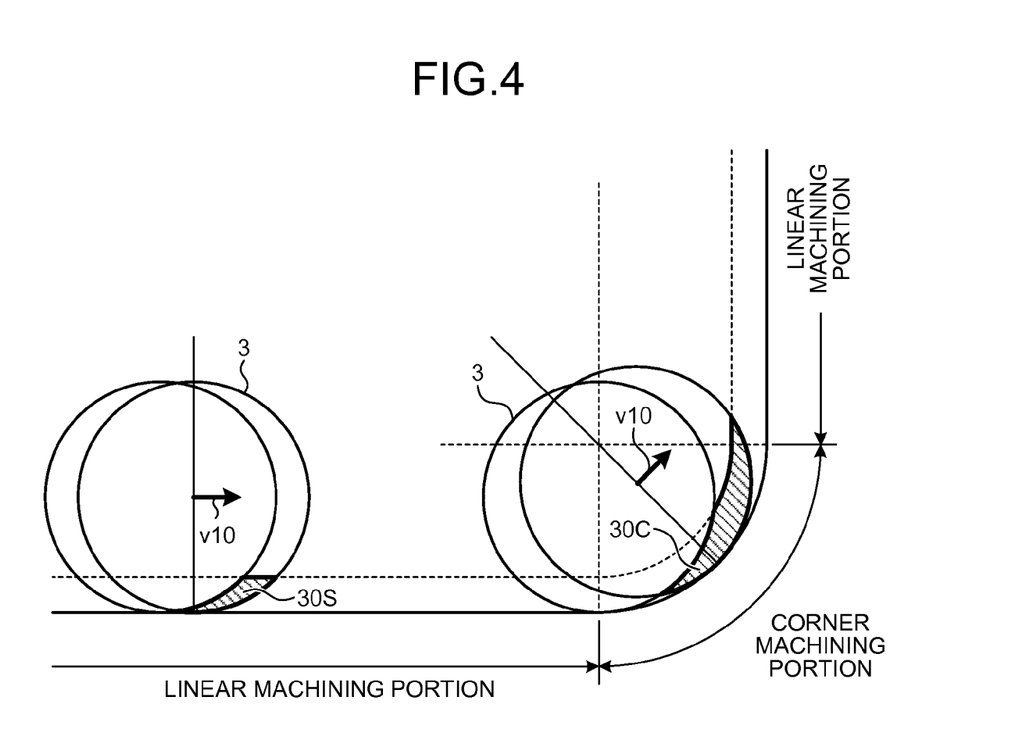
FIG. 4 is an explanatory diagram of the amount of machining at the time of machining an inside corner of a workpiece with an arc trajectory.

FIG. 4 is an explanatory diagram of the amount of machining at the time of machining an inside corner of the workpiece with an arc trajectory. Even when the workpiece 4 is machined at the machining speed v10 both in the linear machining portion (a linear section) and the corner machining portion (a corner section), the amounts of machining in the linear machining portion and the corner machining portion are different.

In FIG. 4, a region 30S denotes the amount of machining in the linear machining portion and a region 30C denotes the amount of machining in the corner machining portion. As shown in FIG. 4, the amount of machining in the corner machining portion is larger than the amount of machining in the linear machining portion. Therefore, the control device 2X controls the machining speed such that the machining speed in the corner machining portion becomes lower than that in the linear machining portion.

Therefore, the speed-ratio computing unit 21 calculates the speed ratio in the corner machining portion on the basis of NC data D1, being a machining program used at the time of performing wire electric-discharge machining on the workpiece 4. At this time, the speed-ratio computing unit 21 calculates the speed ratio by using at least one of a machining condition at the time of discharge machining in a previous stage, experiment results, and a machining trajectory (a machining route) in the NC data D1. The machining condition at the time of discharge machining is, for example, the machining position and electric conditions such as a discharge gap, and the experiment results include a correspondence relation between the machining condition and the speed ratio suitable for the machining condition and the like.

The speed ratio calculated by the speed-ratio computing unit 21 has a value corresponding to the machining volume ratio between the machining volume (the amount of machining) in the linear machining portion and the machining volume in the corner machining portion. The machining volume is the amount of machining of the workpiece 4 to be machined by the wire electrode 3, and the machining volume ratio is given by (machining volume in corner machining portion)/(machining volume in linear machining portion). The speed-ratio computing unit 21 calculates, for example, the reciprocal of the machining volume ratio as the speed ratio, which is the machining feed-speed ratio in the linear machining portion and the corner machining portion. When the reciprocal of the machining volume ratio is set as the speed ratio, the machining feed speed is inversely proportional to the machining volume. The speed-ratio computing unit 21 calculates the speed ratio of 1 or less for the inside-corner machining portion and calculates the speed ratio of 1 or more for the outside-corner machining portion. The speed-ratio computing unit 21 transmits the calculated speed ratio to the multiplier 24.

The subtractor 22 calculates the difference between the inter-electrode voltage command C1 with respect to the inter-electrode, i.e., between the workpiece 4 and the wire electrode 3 and the actual inter-electrode voltage V1. The inter-electrode voltage command C1 is a command indicating a voltage to be applied between the electrodes, and the actual inter-electrode voltage V1 is an inter-electrode voltage to be fed back at the time of machining. The subtractor 22 transmits a value (a voltage value) obtained by subtracting a voltage indicated by the inter-electrode voltage command C1 from the actual inter-electrode voltage V1 to the feedback machining-speed computing unit 23.

The feedback machining-speed computing unit (feedback computing unit) 23 calculates the machining speed (feedback machining speed) to be used for the feedback control of the wire electric-discharge machining on the basis of the voltage value from the subtractor 22. When the voltage value from the subtractor 22 is higher than a predetermined value, the distance (the gap) between the workpiece 4 and the wire electrode 3 is long. Therefore, the feedback machining-speed computing unit 23 increases the moving speed (the machining speed) of the wire electrode 3. On the other hand, when the voltage value from the subtractor 22 is lower than the predetermined value, the distance (the gap) between the workpiece 4 and the wire electrode 3 is short. Therefore, the feedback machining-speed computing unit 23 reduces the moving speed (the machining speed) of the wire electrode 3.

The feedback machining-speed computing unit 23 transmits the calculated machining speed to the multiplier 24.

The multiplier (output-speed computing unit) 24 calculates the machining speed to be used for the control of the machining device 5. Specifically, the multiplier 24 multiplies the machining speed from the feedback machining-speed computing unit 23 by the speed ratio calculated by the speed-ratio computing unit 21 to calculate a machining speed (control machining speed) Sx in the corner machining portion. The multiplier 24 outputs the machining speed Sx being a multiplication result to the machining device 5.

A control process procedure performed by the control device 2X is explained next. At the time of machining the corner machining portion, the NC data D1 as the preliminary information, the machining condition at the time of discharge machining in the previous stage, and the experiment results are input to the speed-ratio computing unit 21. The speed-ratio computing unit 21 calculates the speed ratio to be used at the time of discharge machining in the next stage by using these pieces of information and transmits a calculation result to the feedback machining-speed computing unit 23.

The inter-electrode voltage V1 actually measured in the previous stage and the inter-electrode voltage command C1 being a voltage command in the next stage are input to the subtractor 22. The subtractor 22 subtracts the inter-electrode voltage command C1 from the inter-electrode voltage V1 and transmits a subtraction result (a voltage value) to the feedback machining-speed computing unit 23.

The feedback machining-speed computing unit 23 calculates the machining speed to be used for feedback machining on the basis of the voltage value input from the subtractor 22. The feedback machining-speed computing unit 23 transmits the calculated machining speed to the multiplier 24.

The multiplier 24 multiples the machining speed from the feedback machining-speed computing unit 23 by the speed ratio calculated by the speed-ratio computing unit 21. The multiplier 24 outputs the machining speed Sx being a multiplication result to the machining device 5. Accordingly, the machining device 5 moves the wire electrode 3 at a speed corresponding to the machining speed Sx.

At the time of machining the corner machining portion, the control device 2X repeats the process of multiplying the machining speed calculated on the basis of the fed-back voltage by the speed ratio calculated on the basis of the preliminary information and the process of machining the workpiece 4 at the machining speed being a multiplication result.

At the time of machining the linear machining portion, the speed-ratio computing unit 21 outputs 1 to the multiplier 24. Accordingly, at the time of machining the linear machining portion, the machining speed set to the linear machining portion is input to the multiplier 24.

Figure 5:
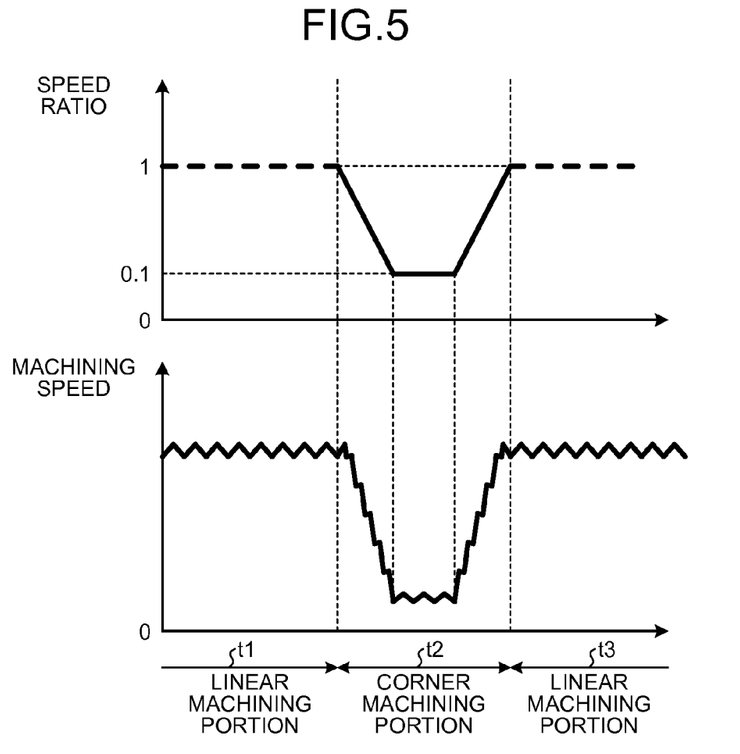
FIG. 5 is a diagram showing an example of the speed ratio and the machining speed.

FIG. 5 is a diagram showing an example of the speed ratio and the machining speed. In FIG. 5, the horizontal axis denotes the time, the vertical axis on the upper stage denotes the speed ratio, and the vertical axis on the lower stage denotes the actual machining speed. As shown on the upper stage, in a corner machining portion t2, after the speed ratio decreases from 1 to 0.1, the speed ratio takes a constant value (0.1) only in a predetermined section, and thereafter, increases to 1 being an original value. In linear machining portions t1 and t3, the speed-RATIO computing unit 21 outputs 1 to the multiplier 24.

The actual machining speed changes according to the speed ratio. This is because actual machining is performed at the machining speed corresponding to the machining speed Sx output from the multiplier 24. Specifically, the machining speed is substantially constant in the linear machining portion t1, the machining speed decreases and then returns to the original machining speed in the corner machining portion t2, and the machining speed is substantially constant in the linear machining portion t3 as in the linear machining portion t1.

According to the present embodiment, machining is performed at the machining speed Sx corresponding to the speed ratio based on the preliminary information, the inter-electrode voltage command C1, and the actual inter-electrode voltage V1. In this manner, by performing machining on the basis of the preliminary information related to the change in the amount of machining, responsiveness even to a rapid change in the amounts of machining of the linear machining portion and the corner machining portion can be ensured. The machining speed is changed by the feedback control such that the state quantity between the electrodes matches the inter-electrode voltage command C1. Accordingly, high skill is not required for adjusting the parameter, and the time required for parameter adjustment is reduced. This is because the state quantity between the electrodes always becomes constant, and thus parameter adjustment for corner machining is not separately required, and the parameter for corner machining can be adjusted in the same manner as in the linear machining.

In the present embodiment, a case where the state quantity between the electrodes becomes the inter-electrode voltage V1 has been explained. However, the state quantity between the electrodes can be other than the inter-electrode voltage V1. For example, the state quantity between the electrodes can be the machining speed, the discharge frequency, or the no-load time. The state quantity between the electrodes can also be a value calculated on the basis of two or more of the inter-electrode voltage, the machining speed, the discharge frequency, and the no-load time.

Figure 6:
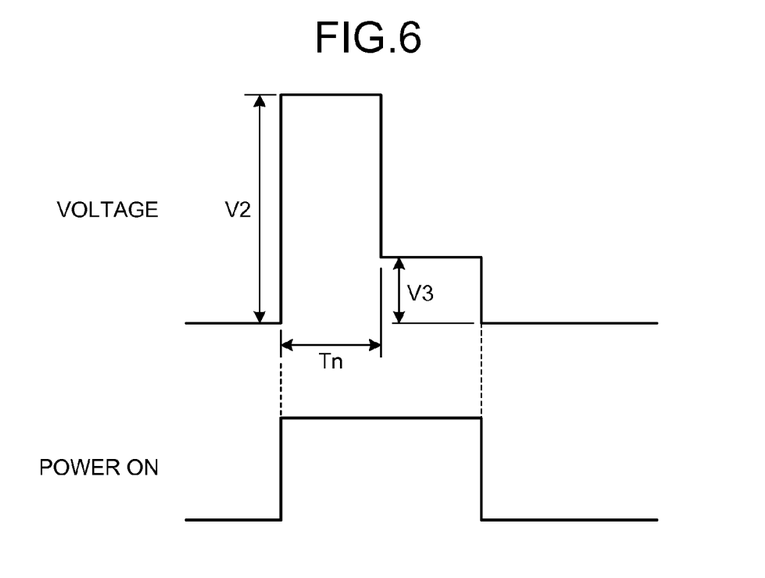
FIG. 6 is an explanatory diagram of a no-load time.

FIG. 6 is an explanatory diagram of the no-load time. In the wire electric-discharge machining apparatus 1, a voltage is generated between the wire electrode 3 and the workpiece 4 by turning on the machining power source 30. In this case, the voltage increases up to V2 at a timing when the machining power source 30 is turned on, and then the voltage drops to V3 when discharge occurs between the wire electrode 3 and the workpiece 4. The time during which the voltage between the wire electrode 3 and the workpiece 4 drops from V2 to V3 is a no-load time Tn.

In the present embodiment, a case of controlling the machining speed has been explained. However, the control device 2X can control a downtime according to the speed ratio based on the preliminary information, the inter-electrode voltage command C1, and the actual inter-electrode voltage V1. The downtime is a pulse-off time during which application of a pulse voltage between the wire electrode 3 and the workpiece 4 is suspended.

According to the first embodiment, the machining speed Sx in the corner machining portion is calculated according to the speed ratio based on the preliminary information and the inter-electrode state, and thus an effect is obtained where highly accurate machining can be easily performed at a machining speed corresponding to the inter-electrode state.

Second Embodiment

A second embodiment of the present invention is explained with reference to FIGS. 7 and 8. In the second embodiment, an appropriate machining speed in a corner machining portion is calculated on the basis of preliminary information, and the machining speed is calculated on the basis of the appropriate machining speed and the inter-electrode state.

Figure 7:
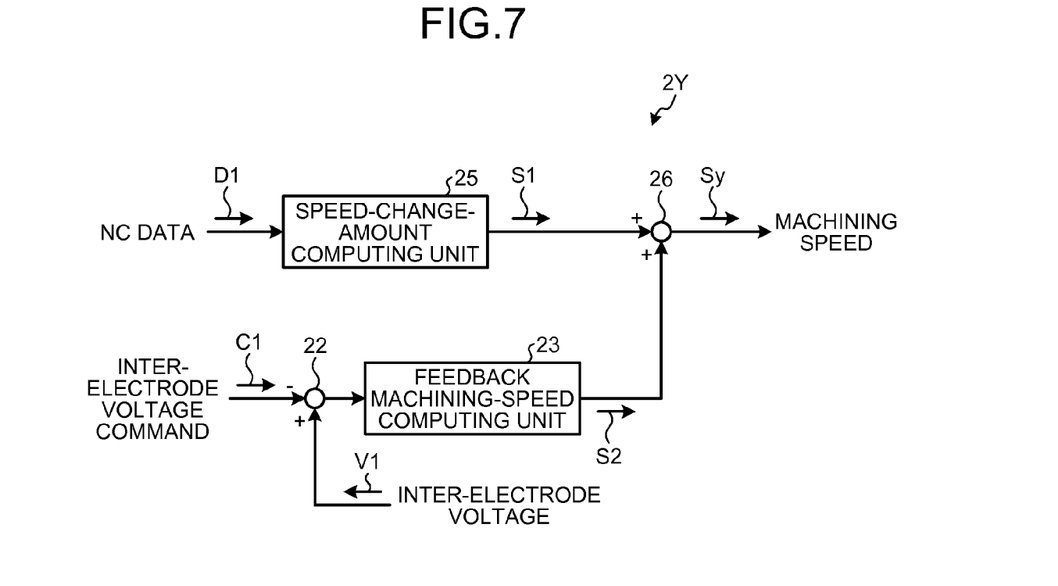
FIG. 7 is a block diagram showing the configuration of a control device according to a second embodiment.

FIG. 7 is a block diagram showing the configuration of a control device according to the second embodiment. Among constituent elements shown in FIG. 7, constituent elements exerting identical functions as those of the control device 2X according to the first embodiment shown in FIG. 2 are designated by like reference numerals and redundant explanations thereof will be omitted.

A control device 2Y includes the subtractor 22, the feedback machining-speed computing unit 23, a speed-change-amount computing unit 25, and an adder 26. The speed-change-amount computing unit 25 calculates an appropriate machining speed in a corner machining portion on the basis of the preliminary information (NC data D1 and the like) obtained beforehand.

The machining speed calculated by the speed-change-amount computing unit 25 is the amount of change in the machining speed in the corner machining portion with respect to the machining speed in the linear machining portion. In other words, the speed-change-amount computing unit 25 calculates the difference between the machining speed in the linear machining portion and the machining speed in the corner machining portion as the machining speed in the corner machining portion (hereinafter, "speed change amount S1"). The speed change amount S1 takes a value corresponding to the machining volume ratio between the machining volume in the linear machining portion and the machining volume in the corner machining portion. The speed-change-amount computing unit 25 transmits the calculated speed change amount S1 to the adder 26.

The speed-change-amount computing unit 25 outputs 0 to the adder 26 at the time of machining the linear machining portion. Accordingly, at the time of machining the linear machining portion, the machining speed set to the linear machining portion is input to the adder 26.

Furthermore, the speed-change-amount computing unit 25 outputs a negative value to the adder 26 at the time of machining the inside-corner machining portion. The speed-change-amount computing unit 25 outputs a positive value to the adder 26 at the time of machining the outside-corner machining portion. Accordingly, at the time of machining the inside-corner machining portion, the machining speed set to the inside-corner machining portion is input to the adder 26, and at the time of machining the outside-corner machining portion, the machining speed set to the outside-corner machining portion is input to the adder 26.

The feedback machining-speed computing unit 23 according to the present embodiment transmits the calculated machining speed (a machining speed S2) to the adder 26. The adder (output-speed computing unit) 26 calculates the machining speed to be used for control of the machining device 5. Specifically, the adder 26 calculates a machining speed Sy by adding the machining speed S2 to the speed change amount S1. The adder 26 outputs the machining speed Sy being an addition result to the machining device 5.

A control process procedure performed by the control device 2Y is explained next. The NC data D1 as the preliminary information, the machining condition at the time of discharge machining in the previous stage, and experiment results are input to the speed-change-amount computing unit 25. The speed-change-amount computing unit 25 calculates the speed change amount S1 to be used at the time of discharge machining in the next stage by using these pieces of information and transmits a calculation result to the adder 26.

The subtractor 22 subtracts the inter-electrode voltage command C1 from the inter-electrode voltage V1 and transmits a subtraction result (a voltage value) to the feedback machining-speed computing unit 23. The feedback machining-speed computing unit 23 calculates the machining speed (the machining speed S2) to be used for feedback machining on the basis of the voltage value from the subtractor 22. The subtractor 22 transmits the calculated machining speed S2 to the adder 26.

The adder 26 adds the speed change amount S1 calculated by the speed-change-amount computing unit 25 to the machining speed S2 output from the feedback machining-speed computing unit 23. The adder 26 outputs the machining speed Sy being an addition result to the machining device 5. Accordingly, the machining device 5 moves the wire electrode 3 at a speed corresponding to the machining speed Sy.

The control device 2Y repeats the process of adding the speed change amount S1 calculated on the basis of the preliminary information to the machining speed S2 calculated on the basis of the fed-back voltage and the process of machining the workpiece 4 at the machining speed Sy being an addition result.

Figure 8:
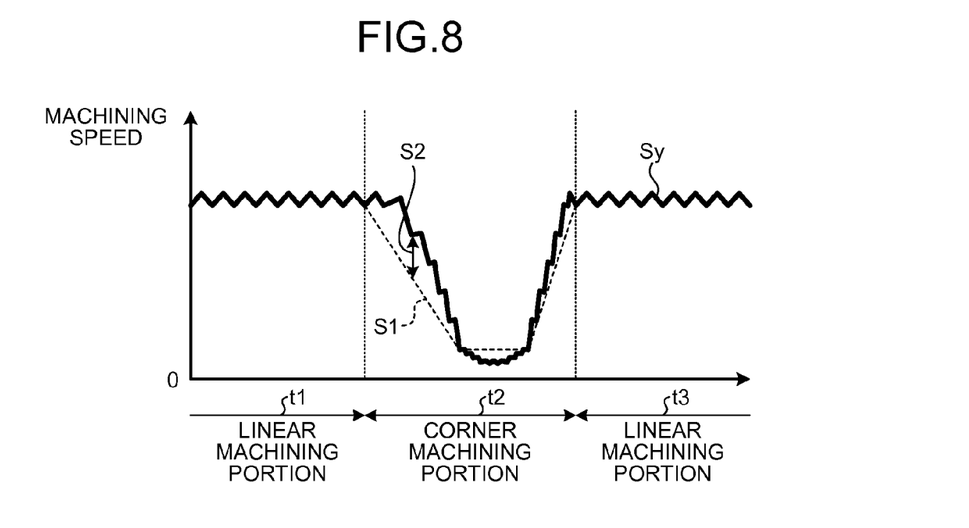
FIG. 8 is a diagram showing an example of the relation between the calculated speed change amount and the actual machining speed.

FIG. 8 is a diagram showing an example of the relation between the calculated speed change amount and the actual machining speed. In FIG. 8, the horizontal axis denotes the time and the vertical axis denotes the machining speed. As shown in FIG. 8, in the corner machining portion t2, after dropping once, the speed change amount S1 takes a constant value only in a predetermined section, and thereafter, increases to the original value. The speed change amount is 0 in the linear machining portions t1 and t3.

The machining speed S2 calculated by the feedback machining-speed computing unit 23 is substantially 0 in the linear machining portion t1. The machining speed S2 takes a value larger than 0 from the start to near the center of the corner machining portion t2, takes a value smaller than 0 near the center, and takes a value larger than 0 from near the center toward the end. The machining speed S2 is substantially 0 in the linear machining portion t3. The machining speed S2 is not necessarily larger than 0 in the first half of the corner machining portion. Furthermore, the machining speed S2 is not necessarily smaller than 0 in the second half of the corner machining portion. That is, the machining speed S2 shown in FIG. 8 is only an example, and there are a timing at which the machining speed S2 becomes positive and a timing at which the machining speed S2 becomes negative according to the machining state.

The machining speed Sy output from the adder 26 is obtained by adding the machining speed S2 to the speed change amount S1. The machining speed Sy takes a substantially constant value in the linear machining portion t1. In the corner machining portion t2, after dropping once, the machining speed Sy increases to the original machining speed. In the linear machining portion t3, the machining speed Sy takes a substantially constant value as in the linear machining portion t1.

According to the second embodiment, the machining speed Sy in the corner machining portion t2 is calculated according to the speed change amount S1 based on the preliminary information and the inter-electrode state, and thus an effect is obtained where machining can be easily performed at a machining speed corresponding to the inter-electrode state.

Third Embodiment

A third embodiment of the present invention is explained next with reference to FIGS. 9 and 10. In the third embodiment, the upper speed limit to be set is reduced during a period in which the speed ratio decreases, in the corner machining portion t2, and the same upper speed limit as that for the linear machining portions t1 and t3 is set for a period in which the speed ratio has a constant value or the speed ratio increases.

Figure 9:
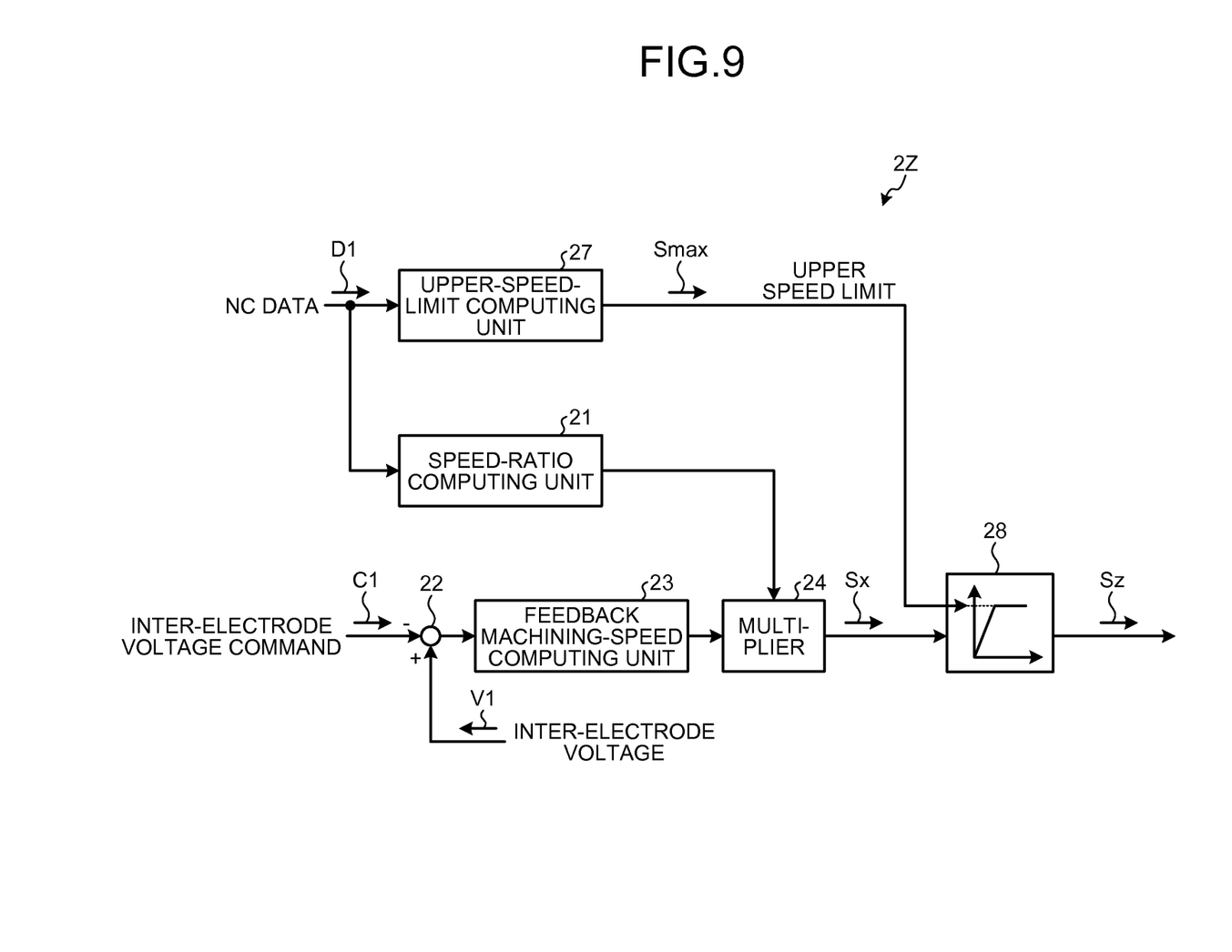
FIG. 9 is a block diagram showing the configuration of a control device according to a third embodiment.

FIG. 9 is a block diagram showing the configuration of a control device according to the third embodiment. Among constituent elements shown in FIG. 9, constituent elements exerting identical functions as those of the control device 2X according to the first embodiment shown in FIG. 2 are designated by like reference numerals and redundant explanations thereof will be omitted.

A control device 2Z includes the speed-ratio computing unit 21, the subtractor 22, the feedback machining-speed computing unit 23, the multiplier 24, an upper-speed-limit computing unit 27, and a speed limiting unit 28. The same information as that input to the speed-ratio computing unit 21 is input to the upper-speed-limit computing unit 27. Specifically, the NC data D1, the machining condition at the time of discharge machining in the previous stage, and the experiment results are input to the upper-speed-limit computing unit 27.

The upper-speed-limit computing unit 27 calculates an upper speed limit Smax in the linear machining portions t1 and t3 and the corner machining portion t2 on the basis of the input information. That is, the upper-speed-limit computing unit 27 calculates the upper speed limit Smax according to the machining condition and the like for each machining position with respect to the workpiece 4. The upper-speed-limit computing unit 27 transmits the calculated upper speed limit Smax to the speed limiting unit 28.

The multiplier 24 according to the present embodiment transmits the machining speed Sx being a multiplication result to the speed limiting unit 28. Accordingly, the upper speed limit Smax and the machining speed Sx are input to the speed limiting unit 28. The speed limiting unit 28 outputs a machining speed Sz in a range in which the machining speed Sx does not exceed the upper speed limit Smax. Specifically, when the machining speed Sx does not exceed the upper speed limit Smax, the speed limiting unit 28 outputs the machining speed Sx directly as the machining speed Sz. When the machining speed Sx exceeds the upper speed limit Smax, the speed limiting unit 28 outputs the upper speed limit Smax as the machining speed Sz.

Figure 10:
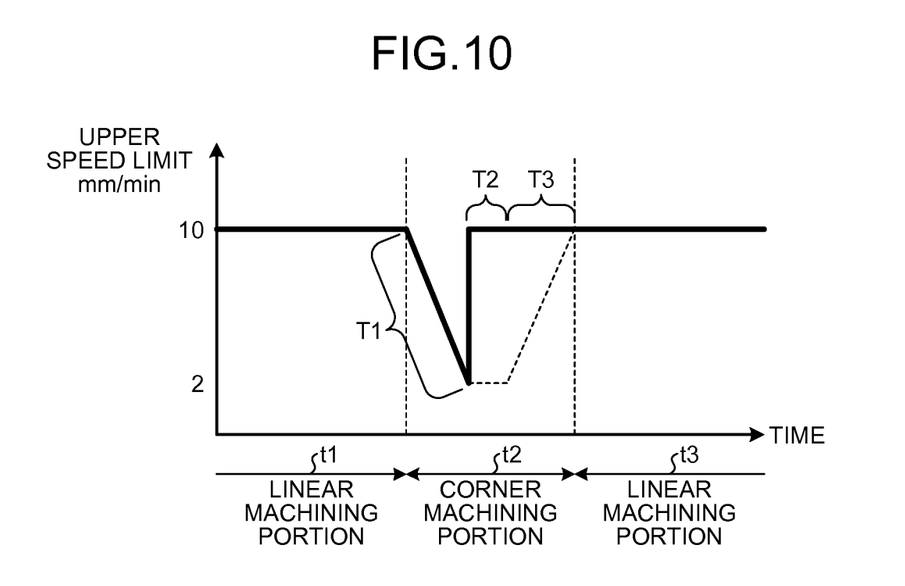
FIG. 10 is a diagram showing an example of the upper speed limit.

FIG. 10 is a diagram showing an example of the upper speed limit. The upper-speed-limit computing unit 27 sets a substantially constant upper speed limit Smax (for example, 10 mm/min) with respect to the linear machining portions t1 and t3. The upper-speed-limit computing unit 27 reduces the upper speed limit Smax in a period (a period T1) in which the speed ratio decreases, in the corner machining portion t2. For example, the upper-speed-limit computing unit 27 reduces the upper speed limit Smax from 10 mm/min to 2 mm/min during the period T1.

The upper-speed-limit computing unit 27 sets the upper speed limit Smax to substantially a constant value in a period (a period T2) in which the speed ratio has a constant value and in a period (a period T3) in which the speed ratio increases, in the corner machining portion t2. For example, the upper-speed-limit computing unit 27 sets 10 mm/min as the upper speed limit Smax with respect to the periods T2 and T3 as in the linear machining portions t1 and t3.

The upper-speed-limit computing unit 27 may not set the upper speed limit Smax in the linear machining portions t1 and t3 and in the periods T2 and T3 in the corner machining portion t2. The upper-speed-limit computing unit 27 and the speed limiting unit 28 can be arranged in the control device 2Y. In this case, in the control device 2Y, the NC data D1 and the like are input to the upper-speed-limit computing unit 27 and the speed-change-amount computing unit 25. The upper speed limit Smax from the upper-speed-limit computing unit 27 and the machining speed Sy from the adder 26 are input to the speed limiting unit 28. When the machining speed Sy does not exceed the upper speed limit Smax, the speed limiting unit 28 directly outputs the machining speed Sy as the machining speed Sz. When the machining speed Sy exceeds the upper speed limit Smax, the speed limiting unit 28 outputs the upper speed limit Smax as the machining speed Sz.

In this manner, according to the third embodiment, the upper-speed-limit computing unit 27 reduces the upper speed limit Smax with respect to the period T1 in which the speed ratio decreases, in the corner machining portion t2. Therefore, the upper-speed-limit computing unit 27 can rapidly reduce the speed when rapid deceleration is required in the corner machining portion t2. Accordingly, short circuit can be prevented at the time of machining the corner machining portion t2.

The upper-speed-limit computing unit 27 sets the same upper speed limit Smax as that for the linear machining portions t1 and t3, for the periods T2 and T3 in the corner machining portion t2. Therefore, during the period in which the speed ratio has a constant value or the speed ratio increases in the corner machining portion t2, it can be prevented that the workpiece 4 and the wire electrode 3 are largely separated from each other. Accordingly, excellent machining can be performed while preventing short circuit at the time of machining.

INDUSTRIAL APPLICABILITY

As described above, the wire electric-discharge machining apparatus, the wire electric-discharge machining method, and the control device according to the present invention are suitable for machining a workpiece while changing the machining speed.

REFERENCE SIGNS LIST

1 wire electric-discharge machining apparatus, 2X to 2Z control device, 3 wire electrode, 4 workpiece, 5 machining device, 21 speed-ratio computing unit, 22 subtractor, 23 feedback machining-speed computing unit, 24 multiplier, 25 speed-change-amount computing unit, 26 adder, 27 upper-speed-limit computing unit, 28 speed limiting unit, t1, t3 linear machining portion, t2 corner machining portion.

The invention claimed is:

1. A wire electric-discharge machining apparatus comprising:
    a machining device that performs wire electric-discharge machining on a linear machining portion and a corner machining portion of a workpiece by using a wire electrode; and
    a control device that controls the machining device, wherein
    the control device includes
        a corner-speed computing unit that calculates machining speed information related to a corner machining speed in the corner machining portion corresponding to an amount of machining in the corner machining portion, on a basis of NC data being a machining program to be used at a time of performing wire electric-discharge machining on the workpiece,
        a feedback computing unit that calculates, as a feedback machining speed to be used for feedback control of the wire electric-discharge machining, a machining speed corresponding to an inter-electrode state between the wire electrode and the workpiece measured during the wire electric-discharge machining, and
        an output-speed computing unit that calculates a control machining speed to be used for control of the machining device at a time of machining the corner machining portion, on a basis of the machining speed information and the feedback machining speed,
    the machining speed information is a speed ratio being a ratio of the corner machining speed to a linear machining speed in the linear machining portion corresponding to an amount of machining in the linear machining portion, and
    the output-speed computing unit calculates the control machining speed by multiplying the feedback machining speed by the speed ratio.

2. The wire electric-discharge machining apparatus according to claim 1, wherein
    the control device further includes
        an upper-speed-limit setting unit that sets a first upper speed limit, being an upper limit value of the corner machining speed, on a basis of the NC data, and
        a speed limiting unit that outputs the first upper speed limit to the machining device in a period during which the control machining speed becomes higher than the first upper speed limit, and outputs the control machining speed to the machining device in a period during which the control machining speed is equal to or lower than the first upper speed limit, and
    the upper-speed-limit setting unit reduces the first upper speed limit in a period during which the speed ratio decreases, and sets the first upper speed limit to a same value as a second upper speed limit, being an upper limit value of the linear machining speed, in a period during which the speed ratio has a constant value and a period during which the speed ratio increases, of a period during which the corner machining portion is subjected to the wire electric-discharge machining.

3. The wire electric-discharge machining apparatus according to claim 1, wherein the feedback computing unit calculates the feedback machining speed on a basis of an inter-electrode voltage command indicating a voltage to be applied between electrodes that are the wire electrode and the workpiece, and a measured actual inter-electrode voltage.

4. A wire electric-discharge machining apparatus comprising:
    a machining device that performs wire electric-discharge machining on a linear machining portion and a corner machining portion of a workpiece by using a wire electrode; and
    a control device that controls the machining device, wherein
    the control device includes
        a corner-speed computing unit that calculates machining speed information related to a corner machining speed in the corner machining portion corresponding to an amount of machining in the corner machining portion, on a basis of NC data being a machining program to be used at a time of performing wire electric-discharge machining on the workpiece,
        a feedback computing unit that calculates, as a feedback machining speed to be used for feedback control of the wire electric-discharge machining, a machining speed corresponding to an inter-electrode state between the wire electrode and the workpiece measured during the wire electric-discharge machining, and
        an output-speed computing unit that calculates a control machining speed to be used for control of the machining device at a time of machining the corner machining portion, on a basis of the machining speed information and the feedback machining speed, the machining speed information is an amount of change in the corner machining speed with respect to a linear machining speed in the linear machining portion corresponding to an amount of machining in the linear machining portion, and the output-speed computing unit calculates the control machining speed by adding the amount of change in the corner machining speed to the feedback machining speed.

5. The wire electric-discharge machining apparatus according to claim 4, wherein the feedback computing unit calculates the feedback machining speed on a basis of an inter-electrode voltage command indicating a voltage to be applied between electrodes that are the wire electrode and the workpiece, and a measured actual inter-electrode voltage.

6. A wire electric-discharge machining method comprising:

a control step of a control device controlling a machining device; and a machining step of the machining device performing wire electric-discharge machining on a linear machining portion and a corner machining portion of a workpiece by using a wire electrode, wherein the control step includes a corner-speed computing step of calculating machining speed information related to a corner machining speed in the corner machining portion corresponding to an amount of machining in the corner machining portion, on a basis of NC data being a machining program to be used at a time of performing wire electric-discharge machining on the workpiece, a feedback computing step of calculating, as a feedback machining speed to be used for feedback control of the wire electric-discharge machining, a machining speed corresponding to an inter-electrode state between the wire electrode and the workpiece measured during the wire electric-discharge machining, and an output-speed computing step of calculating a control machining speed to be used for control of the machining device at a time of machining the corner machining portion, on a basis of the machining speed information and the feedback machining speed, the machining speed information is a speed ratio being a ratio of the corner machining speed to a linear machining speed in the linear machining portion corresponding to an amount of machining in the linear machining portion, and the output-speed computing step includes calculating the control machining speed by multiplying the feedback machining speed by the speed ratio.

7. A wire electric-discharge machining method comprising:

a control step of a control device controlling a machining device; and a machining step of the machining device performing wire electric-discharge machining on a linear machining portion and a corner machining portion of a workpiece by using a wire electrode, wherein the control step includes a corner-speed computing step of calculating machining speed information related to a corner machining speed in the corner machining portion corresponding to an amount of machining in the corner machining portion, on a basis of NC data being a machining program to be used at a time of performing wire electric-discharge machining on the workpiece, a feedback computing step of calculating, as a feedback machining speed to be used for feedback control of the wire electric-discharge machining, a machining speed corresponding to an inter-electrode state between the wire electrode and the workpiece measured during the wire electric-discharge machining, and an output-speed computing step of calculating a control machining speed to be used for control of the machining device at a time of machining the corner machining portion, on a basis of the machining speed information and the feedback machining speed, the machining speed information is an amount of change in the corner machining speed with respect to a linear machining speed in the linear machining portion corresponding to an amount of machining in the linear machining portion, and the output-speed computing step includes calculating the control machining speed by adding the amount of change in the corner machining speed to the feedback machining speed.

8. A control device that controls a machining device that performs wire electric-discharge machining on a linear machining portion and a corner machining portion of a workpiece by using a wire electrode, the device comprising:

a corner-speed computing unit that calculates machining speed information related to a corner machining speed in the corner machining portion corresponding to an amount of machining in the corner machining portion, on a basis of NC data being a machining program to be used at a time of performing wire electric-discharge machining on the workpiece;

a feedback computing unit that calculates, as a feedback machining speed to be used for feedback control of the wire electric-discharge machining, a machining speed corresponding to an inter-electrode state between the wire electrode and the workpiece measured during the wire electric-discharge machining; and an output-speed computing unit that calculates a control machining speed to be used for control of the machining device at a time of machining the corner machining portion, on a basis of the machining speed information and the feedback machining speed, wherein the machining speed information is a speed ratio being a ratio of the corner machining speed to a linear machining speed in the linear machining portion corresponding to an amount of machining in the linear machining portion, and the output-speed computing unit calculates the control machining speed by multiplying the feedback machining speed by the speed ratio.

9. A control device that controls a machining device that performs wire electric-discharge machining on a linear machining portion and a corner machining portion of a workpiece by using a wire electrode, the device comprising:

a corner-speed computing unit that calculates machining speed information related to a corner machining speed in the corner machining portion corresponding to an amount of machining in the corner machining portion, on a basis of NC data being a machining program to be used at a time of performing wire electric-discharge machining on the workpiece;

a feedback computing unit that calculates, as a feedback machining speed to be used for feedback control of the wire electric-discharge machining, a machining speed corresponding to an inter-electrode state between the wire electrode and the workpiece measured during the wire electric-discharge machining; and an output-speed computing unit that calculates a control machining speed to be used for control of the machining device at a time of machining the corner machining portion, on a basis of the machining speed information and the feedback machining speed, wherein the machining speed information is an amount of change in the corner machining speed with respect to a linear machining speed in the linear machining portion corresponding to an amount of machining in the linear machining portion, and the output-speed computing unit calculates the control machining speed by adding the amount of change in the corner machining speed to the feedback machining speed.

* * * * *